US010797288B2

(12) United States Patent
Carlson et al.

(10) Patent No.: US 10,797,288 B2
(45) Date of Patent: Oct. 6, 2020

(54) SEPARATORS FOR ELECTROCHEMICAL CELLS

(71) Applicant: OPTODOT CORPORATION, Devens, MA (US)

(72) Inventors: Steven Allen Carlson, Cambridge, MA (US); Ifenna Kingsley Anakor, Allston, MA (US); Greg Robert Farrell, Sudbury, MA (US)

(73) Assignee: OPTODOT CORPORATION, Devens, MA (US)

( * ) Notice: Subject to any disclaimer, the term of this patent is extended or adjusted under 35 U.S.C. 154(b) by 0 days.

(21) Appl. No.: 16/657,257

(22) Filed: Oct. 18, 2019

(65) Prior Publication Data
US 2020/0106069 A1 Apr. 2, 2020

Related U.S. Application Data

(63) Continuation of application No. 15/799,449, filed on Oct. 31, 2017, now Pat. No. 10,505,168, which is a continuation of application No. 14/534,991, filed on Nov. 6, 2014, now Pat. No. 9,871,239, which is a continuation of application No. 11/652,948, filed on Jan. 12, 2007, now Pat. No. 8,883,354.

(60) Provisional application No. 60/773,487, filed on Feb. 15, 2006.

(51) Int. Cl.
| H01M 2/16 | (2006.01) |
| C04B 26/06 | (2006.01) |
| C04B 14/30 | (2006.01) |
| C04B 24/00 | (2006.01) |
| C04B 24/02 | (2006.01) |
| C04B 38/00 | (2006.01) |
| C04B 111/00 | (2006.01) |

(52) U.S. Cl.
CPC .......... *H01M 2/166* (2013.01); *C04B 14/303* (2013.01); *C04B 24/00* (2013.01); *C04B 24/023* (2013.01); *C04B 26/06* (2013.01); *C04B 38/0074* (2013.01); *H01M 2/16* (2013.01); *H01M 2/164* (2013.01); *H01M 2/1646* (2013.01); *H01M 2/1653* (2013.01); *C04B 2111/00612* (2013.01); *C04B 2111/00801* (2013.01); *C04B 2111/00853* (2013.01); *Y02E 60/10* (2013.01); *Y10T 29/49115* (2015.01)

(58) Field of Classification Search
CPC ............ H01M 2/16; H01M 2/12; H01M 2/10; H01M 2/02; C04B 23/06; C04B 14/30
See application file for complete search history.

(56) References Cited

U.S. PATENT DOCUMENTS

| 3,625,771 A | 12/1971 | Arrance et al. |
| 3,647,554 A | 3/1972 | Arrance et al. |
| 3,703,413 A * | 11/1972 | Arrance ................ H01M 4/244 429/217 |
| 5,162,175 A | 11/1992 | Visco et al. |
| 5,194,341 A | 3/1993 | Bagley et al. |
| 5,314,765 A | 5/1994 | Bates |
| 5,326,391 A | 7/1994 | Anderson et al. |
| 5,340,669 A | 8/1994 | Chaloner-Gill et al. |
| 5,350,645 A | 9/1994 | Lake et al. |
| 5,415,954 A | 5/1995 | Gauthier et al. |
| 5,418,091 A | 5/1995 | Gozdz et al. |
| 5,439,760 A | 8/1995 | Howard et al. |
| 5,549,717 A | 8/1996 | Takeuchi et al. |
| 5,569,520 A | 10/1996 | Bates |
| 5,597,659 A | 1/1997 | Morigaki et al. |
| 5,691,005 A | 11/1997 | Morigaki et al. |
| 5,731,104 A | 3/1998 | Ventura et al. |
| 5,778,515 A | 7/1998 | Menon |
| 5,824,434 A | 10/1998 | Kawakami et al. |
| 5,840,087 A | 11/1998 | Gozdz et al. |
| 5,882,721 A | 3/1999 | Delnick |
| 5,894,656 A | 4/1999 | Menon et al. |
| 5,948,464 A | 9/1999 | Delnick |
| 6,148,503 A | 11/2000 | Delnick |
| 6,153,337 A | 11/2000 | Carlson et al. |
| 6,162,563 A | 12/2000 | Miura et al. |
| 6,183,901 B1 | 2/2001 | Ying et al. |
| 6,190,426 B1 | 2/2001 | Thibault |
| 6,194,098 B1 | 2/2001 | Ying et al. |
| 6,224,846 B1 | 5/2001 | Hurburt et al. |
| 6,268,087 B1 | 7/2001 | Kim et al. |
| 6,277,514 B1 | 8/2001 | Ying et al. |
| 6,287,720 B1 | 9/2001 | Yamashita et al. |
| 6,306,545 B1 | 10/2001 | Carlson et al. |
| 6,328,770 B1 | 12/2001 | Gozdz |

(Continued)

FOREIGN PATENT DOCUMENTS

| CA | 2605874 A1 | 1/2007 |
| CN | 101796668 A | 8/2010 |

(Continued)

OTHER PUBLICATIONS

International Preliminary Report on Patentability—International Application No. PCT/US2007/004104—dated Aug. 19, 2018.

(Continued)

*Primary Examiner* — Kenneth J Douyette

(74) *Attorney, Agent, or Firm* — Amster, Rothstein & Ebenstein LLP

(57) ABSTRACT

Provided are separators for use in an electrochemical cell comprising (a) an inorganic oxide and (b) an organic polymer, wherein the inorganic oxide comprises organic substituents. Also provided are electrochemical cells comprising such separators.

32 Claims, No Drawings

(56) References Cited

U.S. PATENT DOCUMENTS

| | | |
|---|---|---|
| 6,344,293 B1 | 2/2002 | Geronov |
| 6,410,182 B1 | 6/2002 | Ying et al. |
| 6,423,444 B1 | 7/2002 | Ying et al. |
| 6,432,586 B1 | 8/2002 | Zhang |
| 6,444,344 B1 | 9/2002 | Saito et al. |
| 6,451,484 B1 | 9/2002 | Han et al. |
| 6,488,721 B1 | 12/2002 | Carlson |
| 6,495,292 B1 * | 12/2002 | Yen ................. H01M 2/162 429/142 |
| 6,497,780 B1 | 12/2002 | Carlson |
| 6,679,926 B1 | 1/2004 | Kajiura |
| 6,723,467 B2 | 4/2004 | Yoshida et al. |
| 6,811,928 B2 | 11/2004 | Aihara et al. |
| 6,846,435 B1 | 1/2005 | Bohnen et al. |
| 7,014,948 B2 | 3/2006 | Lee et al. |
| 7,029,796 B2 | 4/2006 | Choi et al. |
| 7,066,971 B1 | 6/2006 | Carlson |
| 7,070,632 B1 | 7/2006 | Visco et al. |
| 7,081,142 B1 | 7/2006 | Carlson |
| 7,115,339 B2 | 10/2006 | Nakajima et al. |
| 7,135,250 B2 | 11/2006 | Sasaki et al. |
| 7,160,603 B2 | 1/2007 | Carlson |
| 7,378,185 B2 | 5/2008 | Fujikawa et al. |
| 7,396,612 B2 | 7/2008 | Ohata et al. |
| 7,402,184 B2 | 7/2008 | Ikuta et al. |
| 7,419,743 B2 | 9/2008 | Fujikawa et al. |
| 7,422,825 B2 | 9/2008 | Inoue et al. |
| 7,470,488 B2 | 12/2008 | Lee et al. |
| 7,560,193 B2 | 7/2009 | Ikuta et al. |
| 7,575,606 B2 | 8/2009 | Fukumoto et al. |
| 7,595,130 B2 | 9/2009 | Kawabata et al. |
| 7,638,230 B2 | 12/2009 | Fujita et al. |
| 7,638,241 B2 | 12/2009 | Lee et al. |
| 7,662,517 B2 | 2/2010 | Lee et al. |
| 7,674,559 B2 | 3/2010 | Min et al. |
| 7,682,740 B2 | 3/2010 | Yong et al. |
| 7,682,751 B2 | 3/2010 | Kato et al. |
| 7,687,202 B2 | 3/2010 | Nishino et al. |
| 7,695,870 B2 | 4/2010 | Park et al. |
| 7,704,641 B2 | 4/2010 | Yong et al. |
| 7,709,140 B2 | 5/2010 | Hennige |
| 7,709,152 B2 | 5/2010 | Kim et al. |
| 7,709,153 B2 | 5/2010 | Lee et al. |
| 7,745,042 B2 | 6/2010 | Fujino et al. |
| 7,745,050 B2 | 6/2010 | Kajita et al. |
| 7,754,375 B2 | 7/2010 | Fujikawa et al. |
| 7,754,377 B2 | 7/2010 | Ohata et al. |
| 7,758,998 B2 | 7/2010 | Ohata et al. |
| 7,759,004 B2 | 7/2010 | Ikuta et al. |
| 7,811,700 B2 | 10/2010 | Hennige et al. |
| 7,816,038 B2 | 10/2010 | Ohata et al. |
| 7,829,242 B2 | 11/2010 | Hörpel et al. |
| 7,981,548 B2 | 7/2011 | Mimura |
| 8,277,981 B2 | 10/2012 | Kim et al. |
| 8,883,347 B2 | 11/2014 | Baba et al. |
| 8,883,354 B2 | 11/2014 | Carlson et al. |
| 8,962,182 B2 | 2/2015 | Carlson |
| 9,065,120 B2 | 6/2015 | Carlson |
| 9,070,954 B2 | 6/2015 | Carlson et al. |
| 9,118,047 B2 | 8/2015 | Carlson |
| 9,180,412 B2 | 11/2015 | Jo et al. |
| 9,209,446 B2 | 12/2015 | Carlson |
| 9,660,297 B2 | 5/2017 | Carlson |
| 9,871,239 B2 | 1/2018 | Carlson et al. |
| 2001/0000485 A1 | 4/2001 | Ying et al. |
| 2001/0038938 A1 | 11/2001 | Takahashi et al. |
| 2001/0053475 A1 | 12/2001 | Ying |
| 2002/0092155 A1 | 7/2002 | Carlson et al. |
| 2002/0106561 A1 | 8/2002 | Lee et al. |
| 2002/0141029 A1 | 10/2002 | Calson et al. |
| 2003/0003363 A1 | 1/2003 | Daido |
| 2003/0335995 | 2/2003 | Ohsaki et al. |
| 2003/0118910 A1 | 6/2003 | Carlson |
| 2003/0171784 A1 | 9/2003 | Dodd et al. |
| 2004/0038090 A1 | 2/2004 | Faris |
| 2004/0043295 A1 | 3/2004 | Rodriguez et al. |
| 2004/0058246 A1 | 3/2004 | Choi et al. |
| 2004/0175626 A1 | 9/2004 | Dasgupta |
| 2004/0185335 A1 | 9/2004 | Carlson |
| 2004/0188880 A1 | 9/2004 | Bauer et al. |
| 2004/0241540 A1 | 12/2004 | Tsutsumi et al. |
| 2005/0221190 A1 | 10/2005 | Sudan et al. |
| 2005/0255345 A1 | 11/2005 | Gerritse |
| 2005/0266305 A1 | 12/2005 | Ohata et al. |
| 2006/0008698 A1 | 1/2006 | Kim et al. |
| 2006/0127753 A1 | 6/2006 | Nakashima et al. |
| 2006/0172158 A1 | 8/2006 | Min et al. |
| 2006/0172185 A1 | 8/2006 | Mimura |
| 2006/0177732 A1 | 8/2006 | Visco et al. |
| 2006/0222954 A1 | 10/2006 | Skotheim et al. |
| 2006/0275661 A1 | 12/2006 | Kim et al. |
| 2007/0009803 A1 | 1/2007 | Kim et al. |
| 2007/0065714 A1 | 3/2007 | Hambitzer et al. |
| 2007/0108120 A1 | 5/2007 | Carlson |
| 2007/0110990 A1 | 5/2007 | Carlson |
| 2007/0111070 A1 | 5/2007 | Carlson |
| 2007/0178384 A1 | 8/2007 | Kajita et al. |
| 2007/0184350 A1 | 8/2007 | Kim et al. |
| 2007/0189959 A1 | 8/2007 | Carlson et al. |
| 2007/0190408 A1 | 8/2007 | Inoue et al. |
| 2007/0190427 A1 | 8/2007 | Carlson et al. |
| 2007/0204458 A1 | 9/2007 | Fujita et al. |
| 2007/0243460 A1 | 10/2007 | Carlson et al. |
| 2007/0269714 A1 | 11/2007 | Watanabe et al. |
| 2008/0032197 A1 | 2/2008 | Horpel et al. |
| 2008/0166202 A1 | 7/2008 | Dunlap et al. |
| 2008/0182174 A1 | 7/2008 | Carlson et al. |
| 2008/0285208 A1 | 11/2008 | Sung et al. |
| 2009/0017380 A1 | 1/2009 | Honda et al. |
| 2009/0067119 A1 | 3/2009 | Katayama et al. |
| 2009/0087728 A1 | 4/2009 | Less et al. |
| 2009/0155678 A1 | 6/2009 | Less |
| 2009/0197183 A1 | 8/2009 | Kato |
| 2009/0202912 A1 | 8/2009 | Baba et al. |
| 2009/0246636 A1 | 10/2009 | Chiang et al. |
| 2009/0269489 A1 | 10/2009 | Hennige et al. |
| 2010/0055370 A1 | 3/2010 | Diehl |
| 2010/0003595 A1 | 7/2010 | Baba |
| 2010/0175245 A1 | 7/2010 | Do et al. |
| 2010/0261065 A1 | 10/2010 | Babinec et al. |
| 2011/0052987 A1 | 3/2011 | Katayama et al. |
| 2011/0097623 A1 | 4/2011 | Marinis, Jr. et al. |
| 2011/0281171 A1 | 11/2011 | Yong et al. |
| 2012/0064399 A1 | 3/2012 | Carlson |
| 2012/0064404 A1 | 3/2012 | Carlson |
| 2012/0141877 A1 | 6/2012 | Choi et al. |
| 2012/0189898 A1 | 7/2012 | Wakizaka et al. |
| 2012/0258348 A1 | 10/2012 | Hayakawa |
| 2013/0089770 A1 | 4/2013 | Nishikawa |
| 2013/0171500 A1 | 7/2013 | Xu et al. |
| 2013/0260207 A1 | 10/2013 | Uemura |
| 2014/0170464 A1 | 6/2014 | Iwase |
| 2015/0162586 A1 | 6/2015 | Fleischmann et al. |
| 2015/0249249 A1 | 9/2015 | Ortega et al. |
| 2015/0299551 A1 | 10/2015 | Ota et al. |
| 2015/0364790 A1 | 12/2015 | Yonehara et al. |
| 2016/0141621 A1 | 5/2016 | Negishi et al. |
| 2016/0164145 A1 | 6/2016 | Carlson |
| 2017/0012264 A1 | 1/2017 | Carlson et al. |
| 2017/0098857 A1 | 4/2017 | Carlson |
| 2017/0222206 A1 | 8/2017 | Carlson |
| 2017/0271638 A1 | 9/2017 | Xu et al. |
| 2018/0047963 A1 | 2/2018 | Carlson et al. |

FOREIGN PATENT DOCUMENTS

| | | |
|---|---|---|
| CN | 102437302 A | 5/2012 |
| CN | 102640329 A | 8/2012 |
| CN | 103282408 A | 9/2013 |
| CN | 103283060 A | 9/2013 |
| EP | 0143562 A1 | 6/1985 |
| EP | 0523840 B1 | 1/1993 |
| EP | 0600718 B1 | 6/1994 |
| EP | 0814520 A2 | 12/1997 |

(56) References Cited

FOREIGN PATENT DOCUMENTS

| | | |
|---|---|---|
| EP | 0836238 B1 | 4/1998 |
| EP | 0848435 B1 | 6/1998 |
| EP | 0875950 A2 | 11/1998 |
| EP | 0892449 A1 | 1/1999 |
| EP | 1156544 A2 | 11/2001 |
| JP | H06-140077 A | 5/1994 |
| JP | H08-255615 A | 10/1996 |
| JP | H09-27343 A | 1/1997 |
| JP | H10-214639 A | 8/1998 |
| JP | H11-233144 A | 8/1999 |
| JP | 2000323129 A | 11/2000 |
| JP | 2002-042882 A | 2/2002 |
| JP | 2003-517418 A | 5/2003 |
| JP | 2003-223926 A | 8/2003 |
| JP | 2005235695 A | 9/2005 |
| JP | 2007-227136 A | 9/2007 |
| JP | 2007-258160 A | 10/2007 |
| JP | 2008-041404 A1 | 2/2008 |
| JP | 2008-123988 A | 5/2008 |
| JP | 2008210541 | 9/2008 |
| JP | 2010-056036 A | 3/2010 |
| JP | 5183016 B2 | 4/2013 |
| JP | 2013-535773 A | 9/2013 |
| KR | 20090052556 A | 5/2009 |
| WO | 1991/002385 A1 | 2/1991 |
| WO | 1991/003080 A1 | 3/1991 |
| WO | 1999/031751 A1 | 6/1999 |
| WO | 1999/033125 A1 | 7/1999 |
| WO | 1999/057770 A1 | 11/1999 |
| WO | 2007/006011 A2 | 12/2000 |
| WO | 2001/003824 A1 | 1/2001 |
| WO | 2001/039293 A2 | 5/2001 |
| WO | 2001/039303 A1 | 5/2001 |
| WO | WO-0139293 A2 * | 5/2001 ............. H01M 2/00 |
| WO | 2005/022674 A1 | 3/2005 |
| WO | 2007/095348 A2 | 8/2007 |
| WO | 2009/014388 A2 | 1/2009 |
| WO | 2009/026467 A1 | 2/2009 |
| WO | 2009/066946 A2 | 5/2009 |
| WO | 2010/016881 A1 | 2/2010 |
| WO | 2010/138176 A1 | 12/2010 |
| WO | 2010/138177 A1 | 12/2010 |
| WO | 2010/138179 A1 | 12/2010 |
| WO | 2012/011944 A2 | 1/2012 |
| WO | 2012/113157 A1 | 8/2012 |
| WO | 2013/146126 A1 | 10/2013 |

OTHER PUBLICATIONS

Min Kim et al., "Preparation of a trilayer separator and its application to lithium-ion batteries," Journal of Power Sources, vol. 195, Issue 24, Jul. 2010, pp. 8302-8305, Elsevier B.V.

Daigo Takemura et al., "A powder particle size effect on ceramic powder based separator for lithium rechargeable battery," Journal of Power Sources, vol. 146, 2005, pp. 779-783, Elsevier B.V.

R. J. R. Uhlhorn et al., "Synthesis of ceramic membranes," Journal of Materials Science, vol. 27, pp. 527-537 (1992), Springer Science+Business Media, LLC.

* cited by examiner

SEPARATORS FOR ELECTROCHEMICAL CELLS

RELATED APPLICATIONS

This application is a Continuation of U.S. patent application Ser. No. 15/799,449, filed Oct. 31, 2017 Oct. 31, 2017 (now U.S. Pat. No. 10,505,168), which is a Continuation of U.S. patent application Ser. No. 14/534,991, which is a Continuation of U.S. patent application Ser. No. 14/534,991, filed Nov. 6, 2014 (now U.S. Pat. No. 9,871,239) which is a Continuation of U.S. patent application Ser. No. 11/652,948, filed Jan. 12, 2007 (now U.S. Pat. No. 8,883,354), which claims the benefit of U.S. Provisional Application Ser. No. 60/773,487, filed Feb. 15, 2006, the contents of which are incorporated by reference as if fully set forth herein.

STATEMENT OF GOVERNMENT RIGHTS

This invention was made with government support under Grant Number DE-FG02-02ER83542 awarded by the U.S. Department of Energy. The government may have certain rights in the invention.

FIELD OF THE INVENTION

The present invention relates generally to the field of porous membranes and to the fields of electrochemical cells and of separators for use in electrochemical cells. More particularly, this invention pertains to a porous separator membrane comprising an organically-modified inorganic oxide and an organic polymer. Also, the present invention pertains to electrochemical cells comprising such porous separators.

BACKGROUND

Throughout this application, various publications, patents, and published patent applications are referred to by an identifying citation. The disclosures of the publications, patents, and published patent specifications referenced in this application are hereby incorporated by reference into the present disclosure to more fully describe the state of the art to which this invention pertains.

An electroactive material that has been fabricated into a structure for use in an electrochemical cell is referred to as an electrode. Of a pair of electrodes used in an electrochemical cell, the electrode on the electrochemically higher potential side is referred to as the positive electrode or the cathode, while the electrode on the electrochemically lower potential side is referred to as the negative electrode, or the anode. A battery may contain one or more electrochemical cells.

An electrochemically active material used in the cathode or positive electrode is referred to hereinafter as a cathode active material. An electrochemically active material used in the anode or negative electrode is hereinafter referred to as an anode active material. An electrochemical cell comprising a cathode with the cathode active material in an oxidized state and an anode with the anode active material in a reduced state is referred to as being in a charged state. Accordingly, an electrochemical cell comprising a cathode with the cathode active material in a reduced state, and an anode with the anode active material in an oxidized state, is referred to as being in a discharged state.

Discharging an electrochemical cell in its charged state by allowing electrons to flow from the anode to the cathode through an external circuit results in the electrochemical reduction of the cathode active material at the cathode and the electrochemical oxidation of the anode active material at the anode. To prevent the undesirable flow of the electrons in a short circuit internally from the anode to the cathode, an electrolyte element is interposed between the cathode and the anode. This electrolyte element must be electronically non-conductive to prevent short circuits, but must permit the transport of ions between the anode and the cathode. The electrolyte element should also be stable electrochemically and chemically toward both the anode and the cathode.

Typically, the electrolyte element contains a porous material, referred to as a separator (since it separates or insulates the anode and the cathode from each other), and an aqueous or non-aqueous electrolyte, that usually comprises an ionic electrolyte salt and ionically conductive material, in the pores of the separator. A variety of materials have been used for the porous layer or separator of the electrolyte element in electrochemical cells. These porous separator materials include polyolefins such as polyethylenes and polypropylenes, glass fiber filter papers, and ceramic materials. Usually these separator materials are supplied as porous free-standing membranes that are interleaved with the anodes and the cathodes in the fabrication of electrochemical cells. Alternatively, the porous separator may be applied directly to one of the electrodes, for example, as described in U.S. Pat. No. 5,194,341 to Bagley et al., and in U.S. Pat. No. 6,153,337 to Carlson et al.

Porous separator materials have been fabricated by a variety of processes including, for example, stretching combined with special heating and cooling of plastic films, extraction of a soluble plasticizer or filler from plastic films, and plasma oxidation. The methods for making existing free-standing separators typically involve the extrusion of melted polymeric materials either followed by a post-heating and stretching or drawing process or followed by a solvent extraction process to provide the porosity throughout the separator layer. U.S. Pat. No. 5,326,391 to Anderson et al., and references therein, describe the fabrication of free-standing porous materials based on extraction of a soluble plasticizer from pigmented plastic films. U.S. Pat. No. 5,418,091 to Gozdz et al., and references therein, describe forming electrolyte layers by extracting a soluble plasticizer from a fluorinated polymer matrix either as a coated component of a multilayer battery structure or as an individual separator film.

A liquid organic electrolyte containing organic solvents and lithium salts is typically used as the electrolyte in the pores of the separator in the electrolyte element for lithium-ion electrochemical cells. Alternatively, a gel or solid polymer electrolyte containing an ionically conductive polymer and lithium salts, and optionally organic solvents, might be utilized instead of the liquid organic electrolyte. For example, U.S. Pat. Nos. 5,597,659 and 5,691,005 to Morigaki et al. describe a separator matrix formed of a microporous polyolefin membrane impregnated in its pores with an ionic conductive gel electrolyte.

In addition to being porous and chemically stable to the other materials of the electrochemical cell, the separator should be flexible, thin, economical in cost, and have good mechanical strength. These properties are particularly important when the cell is spirally wound or is folded to increase the surface area of the electrodes and thereby improve the capacity and high rate capability of the cell. Typically, free-standing separators have been 20 microns or greater in thickness. As lithium-ion batteries have continued to evolve to higher volumetric capacities and smaller lightweight structures, there is a need for separators that are 15 microns or less in thickness. Reducing the thickness from 20 microns to 15 microns or less greatly increases the challenge of providing high porosity and good mechanical properties while not sacrificing the protection against short circuits or not significantly increasing the total cost of the separator in each battery.

High porosity in the separator is important for obtaining the high ionic conductivity needed for effective performance in most batteries, except, for example, those batteries operating at relatively low charge and discharge rates. It is desirable for the separator to have a porosity of at least 45 percent, and preferably 50 percent or higher, in lithium-ion batteries. As the separator is reduced in thickness from the typical 20 to 25 microns to 15 microns or less, the approximately 50 percent solids volume of the separator that is not voids or pores, must contribute all of the mechanical properties needed for fabrication into the electrochemical cell and for mechanical integrity during the storage and operation of the battery. Typically, lowering the porosity to increase the mechanical properties also reduces the ionic conductivity. This trade-off between high conductivity and good mechanical properties is a challenge in providing separators that are less than 25 microns in thickness, especially for those that are less than 15 microns thick.

The protection against short circuits is particularly critical in the case of secondary or rechargeable batteries with lithium as the anode active material. During the charging process of the battery, dendrites may form on the surface of the lithium anode and may grow with continued charging. A key feature of the separator in the electrolyte element of lithium-ion rechargeable batteries is that it has a small pore structure, such as 0.5 microns or less in pore diameter, and sufficient mechanical strength to prevent the lithium dendrites from contacting the cathode and causing a short circuit with perhaps a large increase in the temperature of the battery leading to an unsafe condition.

Another highly desirable feature of the separator in the electrolyte element is that it is readily wetted by the electrolyte materials that provide the ionic conductivity. When the separator material is a polyolefin material that has non-polar surface properties, the electrolyte materials (which typically have highly polar properties) often poorly wet the separator material. This results in longer times to fill the battery with electrolyte and potentially in low capacities in the battery due to a non-uniform distribution of electrolyte materials in the electrolyte element.

Further, it would be highly advantageous to be able to prepare separators by a relatively simple process of coating that directly provides ultrafine pores less than 50 nm in diameter and can readily provide a range of thicknesses from 40 microns or greater down to 1 micron.

A separator, particularly one with a thickness less than 15 microns, that is applicable for lithium-ion and other electrochemical cells, and that can reduce the trade-off between high ionic conductivity and good mechanical properties, would be of great value to the battery industry.

SUMMARY OF THE INVENTION

To achieve high porosity and high ionic conductivity while providing good strength and flexibility in separators for use in electrochemical cells, the present invention utilizes organically-modified inorganic oxides in the separators and utilizes various mixing, coating, drying, delaminating, and laminating methods for preparing such separators.

One method of the present invention for preparing a separator for an electrochemical cell comprises the steps of (a) coating onto a substrate a liquid mixture comprising an inorganic oxide, an organic polymer, and an organic compound, preferably a multifunctional monomer or an organic carbonate; (b) drying the coating formed in step (a) to yield a microporous inorganic oxide layer, preferably a xerogel layer; and (c) delaminating the inorganic oxide layer from the substrate to form the separator, wherein the separator comprises the microporous inorganic oxide layer having pores connected in a substantially continuous fashion through the layer. In a preferred embodiment, the inorganic oxide in step (b) and step (c) comprises organic substituents. In one embodiment, the organic substituents comprise a reaction product of the organic compound, preferably a multifunctional monomer and/or an organic carbonate, with the inorganic oxide of step (a). In one embodiment, the inorganic oxide of step (c) comprises a hydrated aluminum oxide of the formula $Al_2O_3 \cdot xH_2O$, wherein x is less than 1.0, and wherein the hydrated aluminum oxide comprises organic substituents, preferably comprising a reaction product of a multifunctional monomer and/or organic carbonate with the inorganic oxide of step (a), such as, for example, pseudo-boehmite. In one embodiment, x is less than 0.8. In one embodiment, x is less than 0.6.

In one embodiment of the methods of preparing a separator of the present invention, the separator formed in step (c) is a free-standing porous membrane comprising the inorganic oxide layer, preferably a xerogel layer. In another embodiment, the inorganic oxide layer of step (b) is laminated to an electrode for an electrochemical cell prior to step (c) and the delamination of step (c) forms the separator laminated to the electrode.

In one embodiment of the methods, separators, and cells of this invention, the porosity of the separator is from 48 percent to 62 percent. In one embodiment, the elastic modulus of the separator is from 15,000 $kg/cm^2$ to 50,000 $kg/cm^2$. In one embodiment, the elastic modulus of the separator is from 30,000 $kg/cm^2$ to 70,000 $kg/cm^2$. In another embodiment, the tensile strength of the separator at 2 percent elongation is from 100 $kg/cm^2$ to 500 $kg/cm^2$. In one embodiment, the percent elongation of the separator at break is from 2 percent to 10 percent. In one embodiment, the percent elongation of the separator at break is from 5 percent to 20 percent. In one embodiment, the percent elongation of the separator at break is greater than 10 percent. In one embodiment, the percent elongation of the separator at break is greater than 15 percent. In one embodiment, the separator does not melt at temperatures lower than 300° C.

In one embodiment of the methods, separators, and cells of this invention, the pore volume of the separator is from 48 percent to 62 percent, the elastic modulus of the separator is greater than 30,000 $kg/cm^2$, and the percent elongation of the separator at break is greater than 5 percent. In one embodiment, the pore volume of the separator is from 48 percent to 62 percent, the elastic modulus of the separator is greater than 30,000 $kg/cm^2$, and the percent elongation of the separator at break is greater than 10 percent.

In one embodiment of the methods, separators, and cells of this invention, the average pore diameter of the inorganic oxide layer, preferably a xerogel layer, is from 2 nm to 70 nm. In one embodiment, the organic polymer is present in the amount of 5 percent to 35 percent of the weight of the organically-modified inorganic oxide in the inorganic oxide layer. In one embodiment, the organic polymer comprises a polymer selected from the group consisting of polyvinyl alcohols, polyethylene oxides, polyvinyl pyrrolidones, and cellulosic polymers. In one embodiment of the methods of the present invention, the inorganic oxide of step (a) is selected from the group consisting of pseudo-boehmites, aluminum oxides, silicon oxides, tin oxides, titanium oxides, and zirconium oxides.

In one embodiment of the methods of preparing a separator of the present invention, the drying of step (b) comprises drying at a temperature greater than 150° C. In one embodiment, the drying at a temperature greater than 150° C. increases the tensile strength of the separator at 2 percent elongation and increases the percent elongation of the separator at break compared to drying for the same period of time at a temperature of 140° C. or less. In one embodiment, the methods further comprise a step (d) of drying at a temperature greater than 150° C.

In one embodiment of the methods, separators, and cells of this invention, the substrate is a silicone release substrate. In one embodiment, the liquid mixture further comprises a surfactant. In one embodiment, the surfactant comprises a fluorosurfactant. In one embodiment, the inorganic oxide layer, preferably a xerogel layer, has a thickness from 2 microns to 25 microns.

Other aspects of this invention are separators prepared by the methods of this invention. In one embodiment of the separators of this invention, the separator comprises a microporous layer comprising (a) an inorganic oxide and (b) an organic polymer, wherein the inorganic oxide comprises organic substituents. In one embodiment, the organic substituents comprise a reaction product of an organic compound, preferably a multifunctional monomer and/or an organic carbonate, with the inorganic oxide. In one embodiment, the inorganic oxide is a hydrated aluminum oxide of the formula $Al_2O_3 \cdot xH_2O$, wherein x is less than 1.0, and wherein the hydrated aluminum oxide comprises organic substituents, preferably comprising a reaction product of a multifunctional monomer and/or organic carbonate with an inorganic oxide, such as, for example, pseudo-boehmite. In one embodiment, x is less than 0.8. In one embodiment, x is less than 0.6.

Still other aspects of the present invention are electrochemical cells comprising the separators prepared by the methods of this invention. In one embodiment of the electrochemical cells of the present invention, the electrochemical cell comprises an anode, a cathode, and a separator of the present invention interposed between the anode and the cathode, wherein the separator comprises a microporous layer comprising (a) an inorganic oxide and (b) an organic polymer, wherein the inorganic oxide comprises organic substituents. In one embodiment, the cell comprises lithium as the anode active material. In one embodiment, the cell is a secondary or rechargeable cell. In one embodiment, the cell is a primary or non-rechargeable cell.

DETAILED DESCRIPTION OF THE INVENTION

The separators and methods of preparing separators of the present invention provide superior properties of ionic conductivity, porosity, strength, and flexibility for use in electrochemical cells, particularly in cells utilizing separators with thicknesses below about 15 microns.

One method of the present invention for preparing a separator for an electrochemical cell comprises the steps of (a) coating onto a substrate a liquid mixture comprising an inorganic oxide, an organic polymer, and a divinyl ether of an ethylene glycol; (b) drying the coating formed in step (a) to yield a microporous inorganic oxide layer, preferably a xerogel layer; and (c) delaminating the inorganic oxide layer from the substrate to form the separator. In one embodiment, the separator comprises a microporous inorganic oxide layer having pores connected in a substantially continuous fashion through the layer. In a preferred embodiment, the inorganic oxide in step (b) and step (c) comprises organic substituents. In one embodiment, the organic substituents comprise a reaction product of the divinyl ether with the inorganic oxide of step (a). As used herein, the term "reaction product" means a product from a reaction that formed covalent bonds, ionic bonds, hydrogen bonds, or surface adsorption between two materials. In one embodiment, the inorganic oxide of step (c) comprises a hydrated aluminum oxide of the formula $Al_2O_3 \cdot xH_2O$, wherein x is less than 1.0, and wherein the hydrated aluminum oxide comprises organic substituents, preferably comprising a reaction product of the divinyl ether with the inorganic oxide of step (a), such as, for example, pseudo-boehmite. In one embodiment, x is less than 0.8. In one embodiment, x is less than 0.6.

Another method of the present invention for preparing a separator for an electrochemical cell comprises the steps of (a) coating onto a substrate a liquid mixture comprising an inorganic oxide, an organic polymer, and an organic carbonate; (b) drying the coating formed in step (a) to yield a microporous inorganic oxide layer, preferably a xerogel layer; and (c) delaminating the inorganic oxide layer from the substrate to form the separator. In one embodiment, the separator comprises the microporous inorganic oxide layer having pores connected in a substantially continuous fashion through the layer. In a preferred embodiment, the inorganic oxide in step (b) and step (c) comprises organic substituents. In one embodiment, the organic substituents comprise a reaction product of the organic carbonate with the inorganic oxide of step (a). In one embodiment, the inorganic oxide of step (c) comprises a hydrated aluminum oxide of the formula $Al_2O_3 \cdot xH_2O$, wherein x is less than 1.0, and wherein the hydrated aluminum oxide comprises organic substituents, preferably comprising a reaction product of the organic carbonate with the inorganic oxide of step (a), such as, for example, pseudo-boehmite. In one embodiment, x is less than 0.8. In one embodiment, x is less than 0.6.

Still another method of the present invention for preparing a separator for an electrochemical cell comprises the steps of (a) coating onto a substrate a liquid mixture comprising an inorganic oxide, an organic polymer, a divinyl ether of an ethylene glycol, and an organic carbonate; (b) drying the coating formed in step (a) to yield a microporous inorganic oxide layer, preferably a xerogel layer; and (c) delaminating the inorganic oxide layer from the substrate to form the separator. In one embodiment, the separator comprises the microporous inorganic oxide layer having pores connected in a substantially continuous fashion through the layer. In a preferred embodiment, the inorganic oxide in step (b) and step (c) comprises organic substituents. In one embodiment, the organic substituents comprise a reaction product of the divinyl ether and/or the organic carbonate with the inorganic oxide of step (a). In one embodiment, the inorganic oxide of step (c) comprises a hydrated aluminum oxide of the formula $Al_2O_3 \cdot xH_2O$, wherein x is less than 1.0, and wherein the hydrated aluminum oxide comprises organic substituents, preferably comprising a reaction product of the divinyl ether and/or the organic carbonate with the inorganic oxide of step (a), such as, for example, pseudo-boehmite. In one embodiment, x is less than 0.8. In one embodiment, x is less than 0.6.

One method of the present invention for preparing a separator for an electrochemical cell comprises the steps of (a) coating onto a substrate a liquid mixture comprising an inorganic oxide, an organic polymer, and a divinyl ether of an ethylene glycol; (b) drying the coating formed in step (a) to yield a microporous inorganic oxide xerogel layer; and (c) delaminating the inorganic oxide xerogel layer from the substrate to form the separator, wherein the separator comprises the microporous inorganic oxide xerogel layer having pores connected in a substantially continuous fashion through the xerogel layer. Another method of the present invention for preparing a separator for an electrochemical cell comprises the steps of (a) coating onto a substrate a liquid mixture comprising an inorganic oxide, an organic polymer, and an organic carbonate; (b) drying the coating formed in step (a) to yield a microporous inorganic oxide xerogel layer; and (c) delaminating the inorganic oxide xerogel layer from the substrate to form the separator, wherein the separator comprises the microporous inorganic oxide xerogel layer having pores connected in a substantially continuous fashion through the xerogel layer.

Still another method of the present invention for preparing a separator for an electrochemical cell comprises the steps of (a) coating onto a substrate a liquid mixture comprising an inorganic oxide, an organic polymer, a divinyl ether of an ethylene glycol, and an organic carbonate; (b) drying the coating formed in step (a) to yield a microporous inorganic oxide xerogel layer; and (c) delaminating the inorganic oxide xerogel layer from the substrate to form the separator, wherein the separator comprises the microporous inorganic oxide xerogel layer having pores connected in a substantially continuous fashion through the xerogel layer. Typically, the liquid mixture will also comprise water.

Methods of preparing microporous xerogel separators for electrochemical cells are described in U.S. Pat. Nos. 6,153,337 and 6,306,545, and in U.S. Pat. Application 20020092155, all to Carlson et al. The liquid mixture described in these references for coating xerogel separators comprises an inorganic oxide, an organic binder, and typically water as the volatile liquid in the mixture. Optionally, the liquid mixture comprises organic solvents, preferably protic organic solvents. Examples of protic organic solvents are alcohols and glycols.

In the instant invention, it has been found that the presence of a divinyl ether of an ethylene glycol or the presence of an organic carbonate, or the presence of a combination of both a divinyl ether of an ethylene glycol and an organic carbonate, in the liquid mixture comprising an inorganic oxide and an organic polymer produces microporous separators, including microporous xerogel separators, having significantly improved ionic conductivity and improved strength and flexibility properties, compared to separators prepared without one of these divinyl ether or organic carbonate materials in the liquid mixture. In a preferred embodiment, the divinyl ether and/or organic carbonate material reacts with the inorganic oxide, such as boehmite, to form a new material, an organically-modified inorganic oxide.

The drying process to form a xerogel layer involves the removal of the liquid in the liquid mixture. As is known in the art of inorganic oxide xerogel coatings, as the liquid is removed, the colloidal particles of inorganic oxide sol form a gel that, upon further loss of liquid, forms a 3-dimensional microporous network of inorganic oxide. By the terms "xerogel layer" and "xerogel structure," as used herein, is meant, respectively, a layer of a coating or the structure of a coating layer in which the layer and structure were formed by drying a liquid sol or sol-gel mixture to form a solid gel matrix as, for example, described in *Chem. Mater.*, Vol. 9, pages 1296 to 1298 (1997) by Ichinose et al. for coating layers of inorganic oxide based xerogels. Thus, if the liquid of the gel formed in the liquid sol-gel mixture is removed substantially, for example, through the formation of a liquid-vapor boundary phase, the resulting gel layer or film is termed, as used herein, a xerogel layer. Thus, the microporous xerogel layers of this invention comprise a dried microporous three-dimensional solid network with pores which are interconnected in a substantially continuous fashion from one outermost surface of the layer through to the other outermost surface of the layer. A continuous xerogel coating layer has the materials of the xerogel in a continuous structure in the coating layer, i.e., the materials, such as the organically-modified inorganic oxide particles, are in contact and do not have discontinuities in the structure, such as a discontinuous layer of solid pigment particles that are separated from each other. In contrast, xerogel pigment particles may be formed by a xerogel process involving drying a liquid solution of a suitable precursor to the pigment to form a dried mass of xerogel pigment particles, which is typically then ground to a fine powder to provide porous xerogel pigment particles. The microporous organically-modified inorganic oxide layers of this invention may be, but are not limited to, xerogel layers. The organically-modified inorganic oxide layers of the present invention may also be discontinuous layers of solid pigment particles that are not a xerogel coating layer and have discontinuities of solid pigment particles that are separated from each other in the structure of the discontinuous layer. This separation typically involves organic polymer interposed between the pigment particles. The terms "xerogel coating" and "xerogel coating layer," as used herein, are synonymous with the term "xerogel layer."

As used herein, the term "microporous" describes the material of a layer or coating, in which the material possesses pores of a diameter of about 1 micron or less. As used herein, the term "nanoporous" describes the material of a layer or coating, in which the material possesses pores of a diameter of about 100 nanometers or less.

Preferably for battery separator applications, these pores are connected in a substantially continuous fashion from one outermost surface of the xerogel layer through to the other outermost surface of the layer. This substantially continuous 3-dimensional microporous inorganic oxide network is efficient in allowing the diffusion of ions, such as lithium ions, through the separator during the charging and discharging of the electrochemical cell.

The delamination in step (c) is not limited to xerogel or to organically-modified inorganic oxide microporous layers that are directly coated onto the substrate and includes any separator that comprises a xerogel layer or comprises an organically-modified inorganic oxide microporous layer. As noted above, the organically-modified inorganic oxide microporous layers of this invention may be either xerogel layers or non-xerogel layers with a discontinuous layer of solid pigment particles that are separated from each other. Thus, there may be one or more other types of layers, preferably microporous layers, between the xerogel or the organically-modified inorganic oxide layer and the substrate. Similarly, there may be one or more other types of layers, preferably microporous layers, on the side of the xerogel or the organically-modified inorganic oxide layer opposite from the substrate.

In one embodiment of the separators and of the methods of preparing a separator of the present invention, the separator formed in step (c) is a free-standing porous membrane comprising the inorganic oxide xerogel layer. In one embodiment, the separator formed in step (c) is a freestanding porous membrane comprising an inorganic oxide and an organic polymer, wherein the inorganic oxide comprises organic substituents. Typically, in order to have sufficient mechanical strength for fabrication into an electrochemical cell by a winding or other process without the cost and complexity of making a very thick separator, the freestanding porous membrane prepared by the methods of this invention has a thickness from 6 microns to 25 microns. In another embodiment, the microporous inorganic oxide layer of step (b) is laminated to an electrode for an electrochemical cell prior to step (c) and the delamination of step (c) forms the separator laminated to the electrode. By this method, the mechanical strength requirements for fabrication into an electrochemical cell are provided by the electrode, which is typically coated on an aluminum or copper foil that is 10 microns or more in thickness and is mechanically strong. Accordingly, the separator for use in a prelaminate of an electrode and separator may have a thickness as low as about 1 micron.

The amount of the pores in the separator may be characterized by the percent porosity or percent pore volume, which is the cubic centimeters of pores per cubic centimeters of the separator. The porosity may be measured by filling the pores with a relatively non-volatile liquid having a known density and then calculated by the increase in weight of the separator with the liquid present divided by the known density of the liquid and then dividing this quotient by the volume of the separator, as calculated from the area and average thickness of the separator. In one embodiment of the separators and of the methods of preparing separators of this invention, the pore volume of separator is from 48 percent to 62 percent. Below a pore volume of 48 percent, the ionic conductivity is typically reduced. Above a pore volume of 62 percent, the mechanical properties are typically reduced.

The mechanical properties of the separator in the range of 0 percent to 2 percent elongation, as expressed by its elastic modulus or Young's modulus properties and by its tensile strength at 2% elongation, are important for efficiency and good yields during the fabrication process, which is typically done by a winding process of combining the electrodes and separator. Once a separator has elongated by more than about 2 percent, its width has been lowered significantly and possibly some distortion has occurred, such that the separator is likely to be no longer suitable for use in the electrochemical cell due to the enhanced risk of short circuits. This is true in spite of the extra width usually incorporated into the separator compared to the width of the electrodes in order to prevent short circuits on the edges of the electrodes. In one embodiment of the separators and of the methods of preparing separators of this invention, the elastic modulus of the separator is from 15,000 kg/cm$^2$ to 50,000 kg/cm$^2$. In one embodiment, the elastic modulus of the separator is from 30,000 kg/cm$^2$ to 70,000 kg/cm$^2$. By contrast, the elastic modulus of a polyolefin separator is typically about 10,000 to 15,000 kg/cm$^2$. In another embodiment, the tensile strength of the separator at 2 percent elongation is 100 kg/cm$^2$ to 500 kg/cm$^2$. By contrast, the tensile strength of a polyolefin separator is typically about 100 kg/cm$^2$ at 2 percent elongation. In one embodiment, the percent elongation of the separator at break is 2 percent to 10 percent. In one embodiment, the percent elongation of the separator at break is from 5 percent to 20 percent. In one embodiment, the percent elongation of the separator at break is greater than 10 percent. In one embodiment, the percent elongation of the separator at break is greater than 15 percent. An elongation at break above 5%, and preferably above 10%, is usually sufficient elongation to indicate good flexibility in the separator and to protect against brittleness in the separator.

In one embodiment of the separators and of the methods of preparing a separator of this invention, the average pore diameter of the microporous inorganic oxide layer is from 2 nm to 70 nm. Typically, the average pore diameter of the microporous inorganic oxide layer is from 30 to 50 nm. These extremely small pores, that are about 5 to 10 times smaller than the average pore dimensions of polyolefin separators, present no limitation to high conductivity with lithium salt electrolytes. Thus, the pore sizes of the separators of this invention may provide ion transport and conductivity with lithium-ion battery electrolytes that is at least equal to that of polyolefin separators. The divinyl ether of an ethylene glycol and/or organic carbonate additives in the liquid mixture of the separators and of the methods of preparing separators of the present invention are useful in enhancing this level of ionic conductivity while maintaining or improving the porosity and the mechanical properties of the microporous inorganic oxide separator.

In one embodiment of the separators and of the methods of preparing separators of the present invention, the organic polymer is present in the amount of 5 percent to 35 percent of the weight of the organically-modified inorganic oxide in the microporous inorganic oxide layer. In a preferred embodiment, the organic polymer is present in the amount of 10 to 15 percent of the weight of the organically-modified inorganic oxide in the microporous inorganic oxide layer. These weight ratios are typical when the density of the organically-modified inorganic oxide is about 3 g/cm$^3$ and should be adjusted to similar volume percent ratios of the organic polymer and inorganic oxide if the density of the organically-modified inorganic oxide is significantly higher or lower than 3 g/cm$^3$ or if the density of the organic polymer differs significantly from 1.3 g/cm$^3$. At higher polymer levels, the pore volume and ionic conductivity are lowered. At lower polymer levels, the mechanical properties are lowered.

In one embodiment of the methods of preparing separators of this invention, the inorganic oxide of step (a) is selected from the group consisting of pseudo-boehmites, aluminum oxides, silicon oxides, tin oxides, zirconium oxides, and titanium oxides. Preferred inorganic oxides are aluminum boehmite and zirconium oxides. The term "pseudo-boehmite," as used herein, pertains to hydrated aluminum oxides having the chemical formula, $Al_2O_3 \cdot xH_2O$ wherein x is in the range of 1.0 to 1.5. Terms used herein, which are synonymous with "pseudo-boehmite," include "aluminum boehmite," "boehmite," "AlOOH," and "hydrated alumina." The materials referred to herein as "pseudo-boehmite" are distinct from anhydrous aluminum oxides or aluminas ($Al_2O_3$ such as alpha-alumina or gamma-alumina) and hydrated aluminum oxides of the formula $Al_2O_3 \cdot xH_2O$ wherein x is less than 1.0 or greater than 1.5. The organically-modified aluminum oxides of the present invention fall outside of this definition of pseudo-boehmite and instead fall under the definition of a hydrated aluminum oxide of the formula $Al_2O_3 \cdot xH_2O$ wherein x is less than 1.0, and wherein the hydrated aluminum oxide further comprises organic substituents.

In one embodiment of the separators and of the methods of preparing separators of this invention, the ethylene glycol of the divinyl ether is selected from the group consisting of ethylene glycol, diethylene glycol, triethylene glycol, and tetraethylene glycol. A preferred ethylene glycol is triethylene glycol.

In one embodiment of the separators and of the methods of preparing separators of the present invention, the organic carbonate is selected from the group consisting of ethylene carbonate, propylene carbonate, butylene carbonate, dimethyl carbonate, ethylmethyl carbonate, vinylene carbonate, dipropyl carbonate, dibutyl carbonate, and diethyl carbonate. In a preferred embodiment, the organic carbonate is ethylene carbonate.

In one embodiment of the separators and of the methods of preparing separators of this invention, the organic polymer comprises a polymer selected from the group consisting of polyvinyl alcohols, polyethylene oxides, polyvinyl pyrrolidones, and cellulosic polymers.

In one embodiment of the methods of preparing a separator of the present invention, the drying of step (b) comprises drying at a temperature greater than 150° C. In one embodiment, the drying at a temperature greater than 150° C. increases the tensile strength of the separator at 2 percent elongation and increases the percent elongation of the separator at break compared to drying for the same period of time at a temperature of 140° C. or less. In one embodiment, the methods further comprise a step (d) of drying at a temperature greater than 150° C.

In one embodiment of the methods of this invention, the substrate is a temporary carrier substrate with the surface on which the liquid mixture is coated on having low adhesion to the dried coating of step (b) such that the microporous inorganic oxide layer may be easily delaminated from the substrate without tearing. At the same time, the adhesion must be strong enough that the inorganic oxide layer does not prematurely delaminate from the substrate during the drying process of step (b) or during mechanical handling to carry out step (c). This balance of enough adhesion to prevent premature delamination during the microporous inorganic oxide drying process that typically includes some shrinkage of the coated layer, together with low adhesion for ease of delamination, may be provided by a variety of substrates, especially those that are very smooth and non-polar and those that have a release coating on a smooth surface. For example, one suitable substrate is a silicone release substrate, such as is used in the coating and delamination process to prepare thin urethane films. The substrate may be a paper, plastic film, metal, or another flexible web substrate.

In one embodiment of the separators and of the methods of preparing separators of this invention, the liquid mixture to prepare the separator and the dried separator further comprises a surfactant. The surfactant may serve a variety of purposes, such as, for example, helping to disperse the inorganic oxide, aiding in the uniform wetting of the liquid mixture on the substrate, and improving the quality of the xerogel layer by its influence on the liquid-air drying process of the microporous layer formation. In one embodiment, the surfactant comprises a fluorosurfactant.

In one embodiment of the separators and of the methods of preparing separators of the present invention, the microporous inorganic oxide layer has a thickness of 2 microns to 25 microns.

Provided are separators prepared by the methods of this invention, as described herein. In one embodiment, the separator for an electrochemical cell separator comprises a microporous inorganic oxide xerogel layer, which xerogel layer comprises an inorganic oxide and an organic polymer, wherein the inorganic oxide comprises a reaction product of a divinyl ether of an ethylene glycol and/or the organic carbonate with an inorganic oxide. In one embodiment, the polymer of a divinyl ether of an ethylene glycol in the xerogel layer is formed by polymerization of the divinyl ether of an ethylene glycol in the liquid mix used in coating the microporous inorganic oxide layer of the separator, and the organic polymer of the inorganic oxide layer comprises this divinyl ether polymer. In one embodiment, the inorganic oxide comprises a reaction product of this divinyl ether polymer and an inorganic oxide. In one embodiment, the separator for an electrochemical cell comprises a microporous inorganic oxide xerogel layer, which xerogel layer comprises an inorganic oxide and an organic polymer, wherein the inorganic oxide comprises a reaction product of an organic carbonate with an inorganic oxide. In one embodiment, the separator for an electrochemical cell comprises a microporous inorganic oxide xerogel layer, which xerogel layer comprises an inorganic oxide, a polyvinyl alcohol, and a polyethylene oxide, wherein the inorganic oxide comprises a reaction product of a divinyl ether of an ethylene glycol or polymer thereof and/or an organic carbonate with an inorganic oxide.

Also provided are electrochemical cells comprising the separators of this invention, as described herein. The electrochemical cells comprise an anode and a cathode and a separator interposed between the anode and the cathode. In one embodiment, the electrochemical cell comprises an anode, a cathode, and a separator interposed between the anode and the cathode, wherein the separator comprises a microporous inorganic oxide layer, preferably a xerogel layer, which microporous layer comprises an inorganic oxide and an organic polymer, wherein the inorganic oxide comprises a reaction product of an organic compound, such as a divinyl ether of an ethylene glycol or polymer thereof and/or an organic carbonate, with an inorganic oxide. In one embodiment, the electrochemical cell comprises an anode, a cathode, and a separator interposed between the anode and the cathode, wherein the separator comprises a microporous inorganic oxide layer, preferably a xerogel layer, which microporous layer comprises an inorganic oxide and an organic polymer, wherein the inorganic oxide comprises a reaction product of an organic carbonate with an inorganic oxide. In one embodiment, the electrochemical cell comprises an anode, a cathode, and a separator interposed between the anode and the cathode, wherein the separator comprises a microporous inorganic oxide layer, preferably xerogel layer, which microporous layer comprises an inorganic oxide, a polyvinyl alcohol, and a polyethylene oxide, wherein the inorganic oxide comprises a reaction product of a divinyl ether of an ethylene glycol or polymer thereof and/or an organic carbonate with an inorganic oxide. In one embodiment of the electrochemical cells of the present invention, the cell comprises lithium as the anode active material. The separators of this invention also may function in non-lithium cells, such as alkaline cells. The cells comprising lithium as the anode active material include lithium-ion cells and cells with lithium metal as the anode. In one embodiment, the cell is a secondary or rechargeable cell. In one embodiment, the cell is a primary or non-rechargeable cell.

EXAMPLES

Several embodiments of the present invention are described in the following examples, which are offered by way of illustration and not by way of limitation.

Example 1

To further improve the mechanical properties, especially flexibility, without compromising ionic conductivity, several types of additives that are soluble or dispersible in water and were expected to have good ionic conductivity and compatibility with lithium ion battery chemistry were evaluated in inorganic oxide xerogel separators where the inorganic oxide was aluminum boehmite. These types of additives were: (1) organic carbonates, such as ethylene carbonate; (2) divinyl ethers of ethylene glycol, such as the divinyl ether of triethylene glycol (available as DVE-3 from International Specialty Products, Wayne, N.J.); and (3) polyethylene glycol (PEO), such as PEO with an average molecular weight of 200.

The comparative separator samples with no additives present were made by the following method. 2.14 grams of glacial acetic acid was added to 107.5 grams of distilled water. 20.68 of Dispal 10F4, a tradename for an aluminum boehmite powder available from Sasol Corporation, Houston, Tex., was added with stirring to the water/acetic acid mix. 41.06 grams of an 8.5% solids solution of Celvol 165, a tradename for polyvinyl alcohol available from Celanese Corporation, Dallas, Tex., was placed in a separate container containing 0.13 grams of Zonyl FSO-100, a tradename for a fluorosurfactant available from E.I. DuPont Corporation, Wilmington, Del., and stirred and heated to above 50° C. The 130.3 grams of the water/acetic acid/Dispal 10F4 mix was added slowly to the hot and stirred solution of Celvol 165 and Zonyl FSO-100. This mix was coated with a #80 wire wound rod onto a 3 mil thick silicone-coated polyester film and dried at 120° C. for 6 minutes in a laboratory convection oven. The resulting microporous coating was delaminated by peeling the layer off of the silicone release polyester film to give a free-standing microporous separator membrane. The separator thickness was measured with a Dorsey gauge. The thickness was typically in the range of 16 to 20 microns. To make the experimental separator samples with the additives that enhance ionic conductivity, the additives were added to the hot and stirring polyvinyl alcohol solution prior to the combination with the aluminum boehmite mix.

These three types of additives were evaluated singly and in combination in the sol gel coating mixes. Surprisingly, these additives made uniform coating mixes with no gelation that gave very uniform microporous coatings when coated and dried. The coatings were made using a #80 wire wound rod with approximately 15% solids solutions and coated onto a 3 mil thick polyester film on the side that had been previously coated with a silicone release layer. The coatings were dried at 120° C. for 6 minutes in a laboratory convection oven. The dry thickness of the xerogel separators for measurement of ionic conductivity and mechanical properties was in the range of 14 to 22 microns. Also surprisingly, the solution life of these xerogel or sol gel mixes was greatly extended from 1 to 2 hours to 48 or more hours by the presence of these additives in the aluminum boehmite sol gel coating mix. This is a very positive feature for manufacturing xerogel-related coated products because the more stable sol gel mixes mean that special processes typically employed, such as in-line mixing at the coating head of the aluminum boehmite sol solution and the organic polymer solution to make the final mix and keeping the coating mix temperature above 50° C. to minimize gelation, may not be needed.

Most importantly and surprisingly, these additives significantly increased the ionic conductivity of the xerogel separator while simultaneously improving the mechanical properties, mainly in the area of providing more flexibility and reducing brittleness. For example, ethylene carbonate was very effective in providing increased ionic conductivity. In combination with a divinyl ether of an ethylene glycol, such as DVE-3, even a further increase in ionic conductivity was observed, and the % elongation of the separator before break increased from about 1% to about 2%. The DVE-3 alone as an additive to the aluminum boehmite sol and polyvinyl alcohol polymer in water also increased the ionic conductivity compared to the control mix with no DVE-3 present. For example, the following ionic conductivity results were obtained with separator coating mixes containing 80 parts of Dispal 10F4, 15 parts of Celvol 165, 0.5 parts of Zonyl FS0-100, and different numbers of relative parts of ethylene carbonate and DVE-3. With mixes containing 3 parts of DVE-3, increasing the parts of ethylene carbonate from 7 to 11 and then to 15 increased the ionic conductivity to 58%, 72%, and 105%, respectively, of the ionic conductivity value measured similarly with Celgard 2500 separator, a tradename for a polypropylene separator available from PolyPore, Inc., Charlotte, N.C. The ionic conductivity was measured using a HP 4294A impedance analyzer with a 1.2M LiBF4 electrolyte solution in 1:1 dimethyl carbonate:ethylene carbonate. With mixes containing 6.2 parts of DVE-3, increasing the parts of ethylene carbonate from 7 to 11 and then to 15 increased the ionic conductivity to 62%, 88%, and 101%, respectively, of the ionic conductivity value measured similarly with Celgard 2500 polypropylene separator.

The PEO additive with an average molecular weight of 200 was particularly effective in further increasing the % elongation from about 2% to about 5% without significantly lowering the ionic conductivity and the tensile modulus and other mechanical strength properties, including in cases where the ethylene carbonate and divinyl ether additives were also present.

Combustion of the various microporous separator samples in a muffle furnace at about 900° C. for 1 hour after prior vacuum drying at 90° C. for 1 hour, was used to estimate the amount of these additives in the coating mix that were retained in the microporous separator after drying. About 2 to 25% of the ethylene carbonate appeared to be retained in the dried microporous coating. While not being bound by any particular theory, this suggests that some of the positive influence of the ethylene carbonate on the microporous separator is from its effect on the porous structure of the separator that is formed during the drying process. The drying process for sol gels from liquids, the so-called xerogel drying process, is highly influenced by the liquid-air interface during the drying. A significant amount of ethylene carbonate in the coating mix, such as about 10% by weight of the solids present, that is soluble in water and is a high boiling solvent, would be expected to influence the nanoporous drying results. In the series of experiments that were done, increasing the amount of ethylene carbonate in the sol gel coating mixes gave a progressively increased ionic conductivity. This was also observed with DVE-3, but the increase in the ionic conductivity was lower than that achieved with ethylene carbonate. DVE-3 is not soluble in water but appears to be dispersed in water if a surfactant, such as the fluorosurfactant, Zonyl FSO 100, is added to the mix. About 10 to 40% of the DVE-3, or a polymer of DVE-3, was estimated to be retained in the microporous separator after coating, drying, and delaminating, when analyzed by the muffle furnace combustion technique, which also included heating at 450° C. for 45 minutes to combust the organic materials without appreciably removing any water of hydration from the inorganic oxide, such as hydrated aluminum oxide. The separator samples with these organic additives of Example 1 showed no signs of melting at 300° C., 450° C., and even at 900° C., but rather retained their original visual appearance, even as their organic content was completely combusted. This supports a xerogel structure for these separator samples, even with the organically-modified inorganic oxide.

The PEO was similar to ethylene carbonate in its retention and is considered to function in a similar manner to ethylene carbonate in the microporous coating and drying process. Some PEO and ethylene carbonate are thought to be retained in the microporous separator, perhaps in a complexed or a reacted state with the aluminum boehmite, and to contribute directly to the increased ionic conductivity. Similarly, DVE-3 is thought to be retained in the microporous separator, perhaps in a complexed or a reacted state with the boehmite, and with perhaps some in a polymerized state of a divinyl polymer.

As evidence of this complexed or reacted state with the boehmite, Dispal 10F4 boehmite powder was measured to be of the formula $Al_2O_3 \cdot xH_2O$ where x is about 1.1. This was done by first drying the Dispal 1OF4 at 450° C. for 45 minutes in a muffle furnace to remove any residual or "free" water and any other residuals. This weight loss was about 0.5%. Further heating at 900° C. for 45 minutes showed a weight loss of 16.1% which relates to about 1.1 moles of $H_2O$ for each mole of $Al_2O_3$. By contrast, 80 parts of Dispal 1OF4 powder mixed with 11 parts of ethylene carbonate or with 6.2 parts of DVE-3 in an approximately 20% solids mix in water and heated at about 80° C. for an hour before drying at 160° C. for 15 minutes, both showed about a 5 to 6% weight loss when heated at 450° C. for 45 minutes and a further about 12% weight loss when heated at 900° C. for 45 minutes. This weight loss of about 12% between 450° C. and 900° C. heating relates to about 0.8 moles of $H_2O$ for each mole of $Al_2O_3$.

Further evidence of the organically-modified inorganic oxide, a sample of Xerogel Separator #1, as described later in Example 1, after heating first at 160° C. for 6 minutes, showed about a 23% weight loss when heated at 450° C. for 45 minutes and a subsequent weight loss of about 7% when heated at 900° C. for 45 minutes. This relates to about 0.5 moles of $H_2O$ for each mole of $Al_2O_3$.

A main contribution of the PEO is to provide increased elongation before break to the microporous separator. This extra elongation relates to much less brittleness in the microporous separator and an increased ability to handle the separator without inducing any tearing or other damage.

Besides these three types of additives, another approach to increasing both the ionic conductivity and mechanical properties was to heat the microporous separator, either before or after delamination, to a temperature significantly higher than the 120° C. at which the mix is typically dried to form the nanoporous membrane layer. For example, good results for increased ionic conductivity and mechanical properties were obtained by heating either a laminated or a delaminated sample of aluminum boehmite microporous separator at 160° C. for 6 minutes. This is a surprising result since heating a xerogel-type coating would be expected to make it more brittle, not less brittle, and would be expected to have no significant effect on the ionic conductivity, rather than having a positive effect. On average, this extra heating increased the ionic conductivity by about 35% compared to the same microporous separator with no extra heating. The tensile strength and percent elongation at break also increased, often by 50% or more up to values of 10% to over 20%, on the samples with the extra heating compared to the same microporous separator with no extra heating. No significant shrinkage of the microporous separator occurred during the extra heating step so there were no problems with distortion or buckling of the microporous membrane from these higher heats. The mass loss from vacuum drying for 1 hour at 90° C. was extremely low at 0.6±0.4%.

The tensile modulus of the hydrated aluminum oxide separators in the key range out to 1.5 to 2% elongation continued to be very good relative to the polyolefin separators, even with these additives that increase flexibility and % elongation. The porosity or pore volume of sol gel separators made from a 15% solids blend of 80:13.5:11:5.5:6.2:0.42 by weight of Celvol 165:Dispal 10F4:ethylene carbonate:PEO (average molecular weight of about 200):DVE-3:Zonyl FS0-100 (Xerogel Separator #1) in water with 2% glacial acetic acid and coated with a #80 wire wound rod to a dry thickness of 20 microns, was 52%. This porosity value was found both when measured by weighing the amount of DVE-3 imbibed into the pores of the separator and also when measured by mercury porosimetry and specific surface area analysis of the pores.

At a Dispal 10F4:Celvol 165 ratio of 80:15 in the control xerogel separators with no additional additives, the % porosity decreased to about 49%. This approximately 5% decrease in porosity was enough to lower the ionic conductivity by about 25%. At 80:20 and 80:18.78 ratios of Dispal 10F4:Celvol 165, the porosities were about 43% and 45%, respectively, with corresponding further decreases in ionic conductivity.

The very good elastic modulus or Young's modulus values are shown in Chart 1 below for the Xerogel Separator #1 described above. The Young's Modulus of about 30,000 $kg/cm^2$ is about 3 times higher than the about 10,000 $kg/cm^2$ measured for the Young's Modulus of Celgard 2500 plastic separator, a porous polypropylene separator available from PolyPore, Inc., Charlotte, N.C.

Chart 1

Tensile Parameters of Xerogel Separator #1

| Parameter | #1 | #2 | #3 | mean | units |
|---|---|---|---|---|---|
| Ultimate Strength | 194 | 167 | 196 | 186 | $kg/cm^2$ |
| Young's Modulus | 37.6 | 25.0 | 31.5 | 31.2 | $10^3 \, kg/cm^2$ |
| Elongation at Break | 3.3% | 4.1% | 7.5% | 5.0% | — |
| T.E.A. at Break | 49 | 585 | 1297 | 810 | $kJ/cm^3$ |
| Thickness | 18.7 | 21.8 | 19.5 | 20.0 | μm |

The "T.E.A" stands for Tensile Energy Absorption and is the area under the stress-strain curve. The elongation or flexibility of these microporous separators is good with a 5% elongation at break on average.

This application incorporates by reference two U.S. patent applications, entitled "Microporous Separators for Electrochemical Cells," U.S. patent application Ser. No. 11/652,857 published as US 2008/0182174 and "Methods of Preparing Separators for Electrochemical Cells," U.S. patent application Ser. No. 11/652,858 published as US 2007/0189959, both filed on Jan. 12, 2007.

While the invention has been described in detail and with reference to specific and general embodiments thereof, it will be apparent to one skilled in the art that various changes and modifications can be made therein without departing from the spirit and scope thereof.

What is claimed is:

1. A porous separator for an electrochemical cell, the separator comprising:
   a hydrated aluminum oxide; and
   an organic polymer that is covalently bonded to at least a portion of said hydrated aluminum oxide.

2. The separator of claim 1, wherein said hydrated aluminum oxide comprises one or more of boehmite and an organically-modified aluminum oxide.

3. The separator of claim 2, wherein said hydrated aluminum oxide further comprises organic substituents.

4. The separator of claim 1, wherein said hydrated aluminum oxide is of a formula $Al_2O_3 \cdot xH_2O$, wherein x is in a range of 0.8 to 1.5.

5. The separator of claim 4, wherein said hydrated aluminum oxide is of the formula $Al_2O_3 \cdot xH_2O$, wherein x is in a range of 0.8 to less than 1.0.

6. The separator of claim 4 wherein said hydrated aluminum oxide is of the formula $Al_2O_3 \cdot xH_2O$, wherein x is in a range of 1.0 to 1.5.

7. The separator of claim 1, wherein said separator further comprises a reaction product of an organic carbonate with said hydrated aluminum oxide.

8. The separator of claim 7, wherein the organic carbonate is ethylene carbonate.

9. The separator of claim 7, wherein the organic carbonate is propylene carbonate.

10. The separator of claim 1, wherein the separator has a tensile strength between about 100 kg/cm² to about 500 kg/cm² at 2 percent elongation.

11. The separator of claim 1, wherein the separator does not melt at temperatures lower than 300° C.

12. The separator of claim 1, wherein the separator is nanoporous.

13. The separator of claim 1, wherein an average pore diameter of the separator is 30 nm to 50 nm.

14. The separator of claim 1, wherein the hydrated aluminum oxide and the organic polymer form a xerogel layer.

15. The separator of claim 14, wherein a thickness of the xerogel layer is from 2 microns to 25 microns.

16. An electrochemical cell comprising:
    an anode,
    a cathode, and
    a separator interposed between the anode and the cathode, the separator comprising:
       a hydrated aluminum oxide, and
       an organic polymer that is covalently bonded to at least a portion of said hydrated aluminum oxide.

17. The electrochemical cell of claim 16, wherein said hydrated aluminum oxide comprises one or more of boehmite and an organically-modified aluminum oxide.

18. The electrochemical cell of claim 17, wherein said hydrated aluminum oxide further comprises organic substituents.

19. The electrochemical cell of claim 16, wherein said hydrated aluminum oxide is of a formula $Al_2O_3 \cdot xH_2O$, wherein x is in a range of 0.8 to 1.5.

20. The electrochemical cell of claim 19, wherein said hydrated aluminum oxide is of the formula $Al_2O_3 \cdot xH_2O$, wherein x is in a range of 0.8 to less than 1.0.

21. The electrochemical cell of claim 19, wherein said hydrated aluminum oxide is of the formula $Al_2O_3 \cdot xH_2O$, wherein x is in a range of 1.0 to 1.5.

22. The electrochemical cell of claim 16, wherein the separator further comprises a reaction product of an organic carbonate with said hydrated aluminum oxide.

23. The electrochemical cell of claim 22, wherein the organic carbonate is ethylene carbonate.

24. The electrochemical cell of claim 22, wherein the organic carbonate is propylene carbonate.

25. The electrochemical cell of claim 16, wherein the separator does not melt at temperatures lower than 300° C.

26. The electrochemical cell of claim 16, wherein the separator has a tensile strength between about 100 kg/cm² to about 500 kg/cm² at 2 percent elongation.

27. The electrochemical cell of claim 16, wherein the separator is nanoporous.

28. The electrochemical cell of claim 16, wherein an average pore diameter of the separator is from 30 nm to 50 nm.

29. The electrochemical cell of claim 16, wherein the hydrated aluminum oxide and the organic polymer form a xerogel layer.

30. The electrochemical cell of claim 29, wherein a thickness of the xerogel layer is from 2 microns to 25 microns.

31. The electrochemical cell of claim 16, wherein the anode comprises lithium as an anode active material.

32. The electrochemical cell of claim 16, wherein the cell is a lithium ion secondary cell.

* * * * *